United States Patent
Lind

Patent Number: 5,226,763
Date of Patent: Jul. 13, 1993

[54] DEVICE FOR PRODUCING DRILLED HOLES WITH AN UNDERCUT

[75] Inventor: Stefan Lind, Tumlingen, Fed. Rep. of Germany

[73] Assignee: Fischerwerke Artur Fischer GmbH & Co. KG., Tumlingen, Fed. Rep. of Germany

[21] Appl. No.: 935,051

[22] Filed: Aug. 24, 1992

[30] Foreign Application Priority Data

Aug. 22, 1991 [DE] Fed. Rep. of Germany ....... 4127745

[51] Int. Cl.$^5$ .............................................. B23B 41/00
[52] U.S. Cl. .................... 408/236; 408/147; 409/143; 409/201
[58] Field of Search ............. 408/88, 147, 180, 236, 408/237, 241 S; 409/143, 201

[56] References Cited

U.S. PATENT DOCUMENTS

| | | | |
|---|---|---|---|
| 2,823,591 | 2/1958 | Craddock et al. | 409/201 |
| 2,969,000 | 1/1961 | Grobecker | 409/179 |
| 4,365,917 | 12/1982 | Harmand | 409/201 |
| 5,018,912 | 5/1991 | Reitz | 408/88 |
| 5,090,848 | 2/1992 | Haug | 409/191 |
| 5,127,777 | 7/1992 | Fischer et al. | 409/143 |

FOREIGN PATENT DOCUMENTS 87085 8/1983 European Pat. Off. ............ 408/180

*Primary Examiner*—Daniel W. Howell
*Attorney, Agent, or Firm*—Michael J. Striker

[57] ABSTRACT

A device for producing drilled holes with an undercut, especially in facing panels, has a drilling machine, a drilling tool, an adaptor receiving the drilling tool and connected with the drilling machine so as to transfer torque, a holder, a bearing bush secured in the holder and provided with a rotatable and swivelable guide sleeve, a wobble plate secured on the drilling machine and the guide sleeve, a plurality of cylinders arranged on the holder concentrically about a center line of the guide sleeve and engaging the wobble plate. The cylinders are actuated and controlled in succession to produce a wobbling movement for reaming out an undercut in a drilled hole.

7 Claims, 2 Drawing Sheets

DEVICE FOR PRODUCING DRILLED HOLES WITH AN UNDERCUT

BACKGROUND THE INVENTION

The present invention relates to a device for producing drilled holes with an undercut, especially in facing panels.

More particularly, it relates to a device for producing drilled holes with an undercut, which has an adaptor receiving a drilling tool and joined to a drilling machine so as to transfer torque, and a bearing bush secured in a holding element of a supporting stand and connected with a guide sleeve.

Devices for producing drilled holes with an undercut of the above mentioned general type are known in the art. In the known devices a bearing bush is produced with a rounded depression in which a drilling tool with a collar is supported and mounted to swivel. When the drilling tool swivels out and simultaneously performs a steering movement the lateral cutting edges provided on the drilling tool ream and undercut in the region of the bottom of the drilled hole. An expansible fixing plug with an expansible sleeve can be inserted into the undercut with a matching fit.

The drilled holes with an undercut can be also made in facing panels or similar structures. However, there the undercut must be made very accurately so that when an expansible anchor is inserted and expanded, the expansion pressure produced in this way is not excessively high. Excessively high expansion pressure can result in breaking away a portion of the facing panel. In order to produce an accurate undercut, the drilling tools having a drilling head with diamond chips are utilized. However, it must be noted that the known devices for produced drilled holes with an undercut are inadequate for such impact-sensitive and shock-sensitive drilling tools and for the required accuracy of the drilled holes with an undercut in double-walled facing panels.

SUMMARY OF THE INVENTION

Accordingly, it is an object of the present invention to provide a device for producing drill holes with an undercut, especially for facing panels, which allows an accurate drilled hole corresponding to the expansible fixing plug to be produced by automatic, machine-controlled, swivelling-out action.

In keeping with these objects and with others which will become apparent hereinafter, one feature of the present invention resides, briefly stated, in a device for producing drilled holes with an undercut, in which a wobble plate is mounted on the drilling machine and the guide sleeve and engaged by several cylinders arranged on holding means and concentrically relative to a center line of the guide sleeve, wherein the cylinders are actuated and controlled successively to produce the wobbling movement for reaming out the undercut.

The cylinders arranged concentrically relative to the center line of the guide sleeve are actuated successively in a clockwise direction or a counterclockwise direction. Therefore the wobble plate secured to the drilling machine is pressed out of its horizontal position into an inclined position. This inclined position shifts in correspondence with the particular piston rod of the cylinder that has been extended or a circle about the center line so that a wobbling movement occurs. During this wobbling movement the two axes are moved forcibly in the swivel-out state of the tool in a circle about its center line, and thus the undercut is reamed out in the drilled hole. The swivel bearing arranged in the holding pins fixes the swivel axis accurately during the wobbling movement.

Due to the automatic swinging-out action of the tool axis and due to the machine-controlled wobbling motion of the drilling machine, the possibilities of error during reaming out the undercut as a result of an incomplete swinging-out action or an incomplete circular movement are avoided. The device is therefore suitable for the series manufacture of undercut drilled holes, particularly for the use of fixing elements for the concealed mounting of facing panels.

In accordance with another feature of the present invention, the piston rod of the cylinder is connected to the wobble plate by way of a pendulum joint. Such a connection avoids jamming and tilting of the device and increased wear and tear of the cylinders.

Still another feature of the present invention is that at least six cylinders are arranged concentrically and uniformly distributed around a center line of the guide sleeve. The number of cylinders influences the uniformity of the wobbling motion. The more even the wobbling motion, the more favorable is the effect of the wear and tear on the drilling tool. Therefore, it is advisable to use at least six cylinders arranged at uniform intervals concentrically around the guide sleeve to produce the wobbling motion.

A further feature of the present invention is that several stops for the wobble plate preferably corresponding to the number of cylinders are arranged on the holding means and concentrically about the center line of the guide sleeve. By providing such stops it is possible to limit the inclined position of the wobble plate, and the stops preferably have the same number as the cylinders.

The stops can be formed by a threaded bolt onto which a threaded sleeve provided with a rounded front end is screwed. This provides easy adjustment of the stops.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
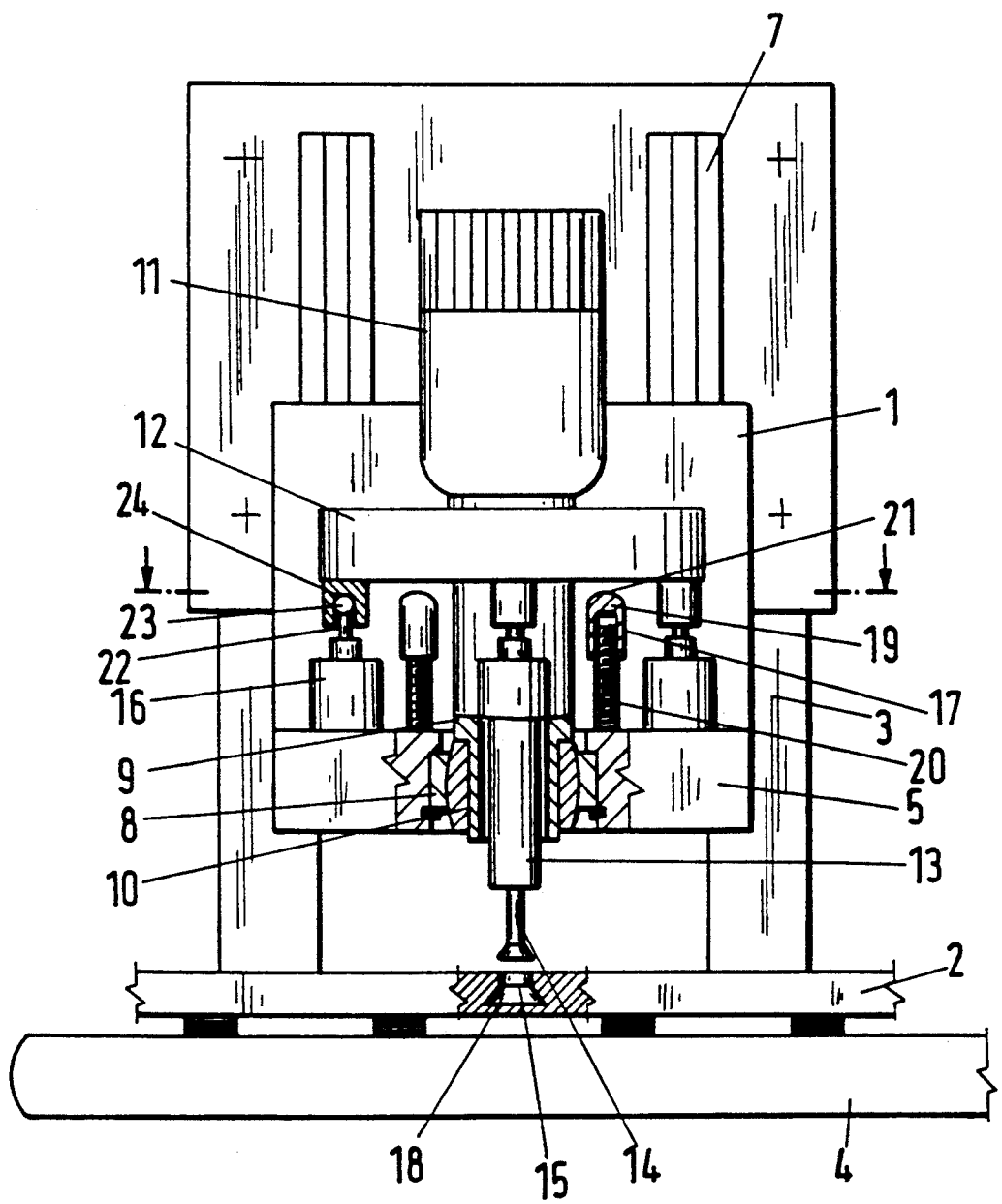
FIG. 1 is a front view of a device for producing drilled holes with an undercut, in accordance with the present invention.

The device in accordance with the present invention is identified as a whole with reference numeral 1 and used for producing drilled holes with an undercut in facing panels 2. The device 1 is integrated in a support 3 having a supporting surface 4, and in some cases having also a clamping arrangement for the facing panel 2. In order to provide a vertical movement of the device 1 two guiding rails 6 are arranged on a holder 5 and engage profiled guides 7 mounted on the support 3.

A swivel bearing is located in the holder 5 and includes a bearing bush 8 and a ball-like collar 10 arranged on a guide sleeve 9. The guide sleeve 9 is fixedly connected with a drilling machine 11 and with a circular wobble plate 12. An adaptor 13 is clamped in a drilled shank of the chuck of the drilling machine 11. A drilling tool 14 provided with diamond chips is inserted in the front end of the adaptor projecting beyond the guide sleeve 9.

In order to drill the drilled hole 15 in facing panel 2, the device 1 is moved downwardly by a rack-and-pinion drive, a lever or similar means which is not shown in the drawings, with the wobble plate horizontal and the drilling machine switch on, and the cylindrical drilled hole is made. When the drilled hole reaches the set depth, the wobble plate 12 with the drilling machine running is brought into an inclined position by actuating and controlling a cylinder 16 until the wobble plate rests on stops 17 lying opposite to this cylinder. As can be seen from the drawings a plurality of cylinders 16 and a plurality of stops 17 are arranged concentrically and uniformly distributed around the center line of the guide sleeve 9. Then the axle of the drilling machine and the drilling tool is swung in the opposite direction about the center point of the swivel bearing. The successively controlled actuation of the cylinder 16 in a clockwise direction or a counterclockwise direction creates a wobbling motion and as a result an undercut 18 of the drilled hole 15 is reamed out. After one or two revolutions, the wobble plate is returned to its horizontal position and the drilling tool is withdrawn from the drilled hole.

The degree of the undercut can be adjusted by the stops 17. By screwing the threaded sleeve 19 to a greater or lesser extent onto a screw 20, the distance of a rounded end face 21 of the threaded sleeve 19 from the wobble plate 12 can be adjusted. For preventing tilting of the cylinders of the wobble plate during wobbling of the device, a piston rod 22 of the cylinder 16 has a ball-like end 23 so as to form a pendulum bearing which engages in a cylindrical bore of a coupling member 24.

Figure 2:
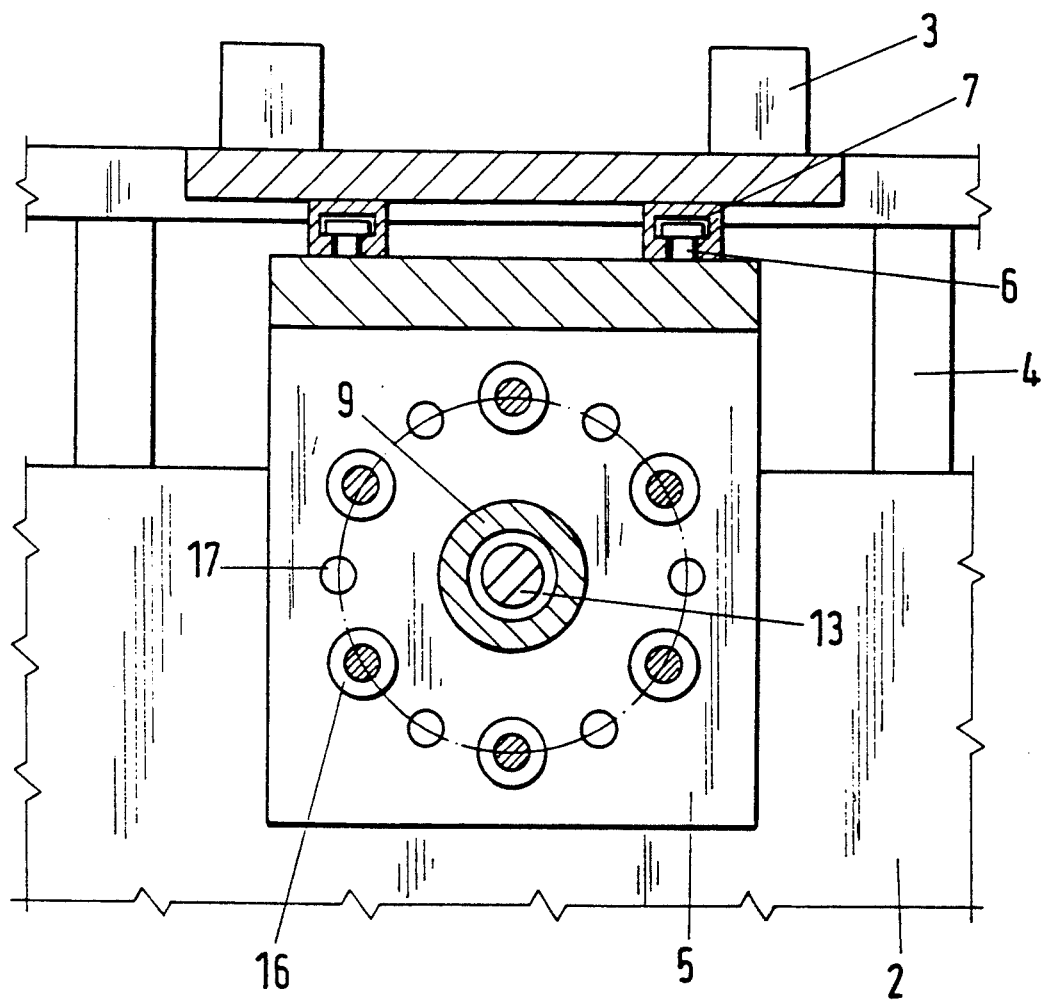
FIG. 2 is a plan view of holding means with cylinders and stops arranged on them, of the inventive device.

A uniform wobbling motion is achieved by providing six cylinders 16 which are actuated in succession in a clockwise direction or a counterclockwise direction and are arranged on the holder 5 concentrically about the guide sleeve 9 as shown in FIG. 2. Six stops 17 are also arranged on the same circle diameter each between two neighboring cylinders and limit the inclined position of the wobble plate 12.

For producing the wobbling motion pneumatic or hydraulic cylinders can be used. It is also possible to provide the drives of other types acting linearly, for example lifting magnets or rack-and-pinion gears.

It will be understood that each of the elements described above, or two or more together, may also find a useful application in other types of constructions differing from the types described above.

While the invention has been illustrated and described as embodied in a device for producing drilled holes with an undercut, especially in facing panels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for producing drilled holes with an undercut, especially in facing panels, comprising a drilling machine; a drilling tool; an adaptor receiving said drilling tool and connected with said drilling machine so as to transfer torque; a holder; a bearing bush secured in said holder and provided with a rotatable and swivelable guide sleeve; a wobble plate secured on said drilling machine and said guide sleeve; a plurality of cylinders arranged on said holder concentrically about a center line of said guide sleeve and engaging said wobble plate, said cylinders being actuated and controlled in succession to produce a wobbling movement for reaming out an undercut in a drilled hole.

2. A device as defined in claim 1; and further comprising a swivel bearing by which said guide sleeve swivels in said bearing bush.

3. A device as defined in claim 1, wherein each of said cylinders has a piston rod; and further comprising a pendulum joint connecting said piston rod of said cylinders with said wobble plate.

4. A device as defined in claim 1, wherein said plurality of cylinders includes at least six cylinders arranged concentrically and uniformly distributed around a center line of said guide sleeve.

5. A device as defined in claim 1; and further comprising a plurality of stops arranged on said holding means concentrically about a center line of said guide sleeve and provided for said wobble plate.

6. A device as defined in claim 5, wherein a number of said stops corresponds to a number of said cylinders.

7. A device as defined in claim 5, wherein each of said stops is formed by a threaded bolt with a threaded sleeve screwed on said threaded bolt and provided with a round front end.

* * * * *